United States Patent [19]
Frei

[11] 4,021,301
[45] May 3, 1977

[54] NUCLEAR REACTOR INSTALLATION

[75] Inventor: Gerhard Frei, Erlangen, Germany

[73] Assignee: Siemens Aktiengesellschaft, Munich, Germany

[22] Filed: Jan. 24, 1974

[21] Appl. No.: 436,145

[30] Foreign Application Priority Data

Jan. 31, 1973  Germany .................... 2304700

[52] U.S. Cl. .................... 176/37; 176/38; 176/51
[51] Int. Cl.$^2$ ........................ G21C 7/22
[58] Field of Search .............. 176/86 L, 51, 52, 37, 176/38

[56] References Cited
UNITED STATES PATENTS

| | | | |
|---|---|---|---|
| 2,989,454 | 6/1961 | Breden et al. | 176/86 L |
| 3,372,092 | 3/1968 | Margen | 176/52 |
| 3,414,476 | 12/1968 | Galli de Paratesi et al. | 176/86 L |
| 3,448,797 | 6/1969 | Chevallier et al. | 176/51 |
| 3,528,884 | 9/1970 | Collier et al. | 176/38 |
| 3,666,622 | 5/1972 | Schluderberg | 176/38 |
| 3,718,539 | 2/1973 | West et al. | 176/38 |
| 3,859,166 | 1/1975 | Flynn et al. | 176/38 |

FOREIGN PATENTS OR APPLICATIONS

| | | | |
|---|---|---|---|
| 1,100,767 | 1/1968 | United Kingdom | 176/86 L |
| 845,805 | 8/1960 | United Kingdom | 176/52 |

Primary Examiner—Harvey F. Behrend
Attorney, Agent, or Firm—Kenyon & Kenyon Reilly Carr & Chapin

[57] ABSTRACT

A nuclear reactor installation includes a pressurized-water reactor having a main coolant pipe line loop provided with a pressurizer. The steam space of the pressurizer is connected to a tank containing a concentrated solution of boric acid and which is connected with the loop via a normally-closed valve means which opens when the loop pressure reduces below normal, so that the steam pressure in the pressurizer, drives the solution from the tank into the loop and thus into the reactor where the concentrated boric acid solution provides equalization for the increase in the reactor's core reactivity which takes place when the coolant temperature drops.

5 Claims, 2 Drawing Figures

NUCLEAR REACTOR INSTALLATION

BACKGROUND OF THE INVENTION

A nuclear reactor installation of the pressurized-water reactor type includes a main pressurized-water coolant pipe line loop circulating the coolant through the reactor and a steam generator producing steam representing useful power. To provide the necessary pressure on the coolant circulating in the loop, a pressurizer is connected with the loop, the pressurizer chamber receiving a portion of the coolant and having a steam space thereabove containing steam applying the pressure to the coolant.

A portion of the coolant in the loop is continuously removed and subjected to treatment and returned to the loop and in the loop the coolant may be admixed with a solution of boric acid in water as suggested by the text VGB-Kernkraftwerks-Seminar 1970, p. 41, FIG. 2. The boric acid solution there referred to has a concentration that is relatively low, being not more than 1,200 ppm, and the volume fed to the coolant is relatively small compared to the overall volume of the coolant. This practice is called chemical trimming, is used only for the normal operation of the reactor and has no appreciable effect insofar as substantial changes in the reactivity of the reactor core are concerned.

If for any reason the pressure of the coolant circulating in the loop drops, such as in the case of an accident, there is an increase in the reactivity of the reactor core. Consequently, with such a pressure drop, conventional reactor shut-down devices, such as the control rods, may be damaged to such an extent as to require replacement. Therefore, there has been a problem of quickly and reliably controlling the reactor activity when the pressure in the main coolant pipe line loop accidentally drops, and the object of the present invention is to solve this problem.

SUMMARY OF THE INVENTION

With the above object in mind, a tank containing a concentrated solution of boric acid in water has its upper portion connected by a pipe with the pressurizer's steam space so that this solution is maintained under the steam pressure existing in that space; the pressurizer is essentially a chamber having a lower portion connected by a pipe with the loop and containing a portion of the coolant while leaving an upper space for the steam which pressurizes the coolant. In the present instance this pressure is also applied to the concentrated boric acid solution. The concentration of this solution should be more than 10,000 ppm. This is sufficient to result in precipitation or crystallization of the boric acid from its water solvent at normal ambient temperatures, the invention, therefore, providing that the tank be provided with heating means keeping the concentrated solution at a temperature high enough to keep the boric acid in solution.

The lower portion of this concentrated boric acid solution tank is connected by a pipe with the main reactor coolant pipe line loop, via a valve means which is normally closed but which opens automatically in response to the loop pressure decreasing abnormally. In other words, the valve means is responsive to any substantial increase in the pressure differential between the interior of the tank and the main coolant loop. Such a valve may be of the type comprising a valve casing normally closed by a diaphragm designed to rupture under the force of a pressure differential known to indicate a coolant loop pressure decrease that is abnormal; that is to say, sufficient to result in excessive core reactivity.

With the concentrated boric-acid-solution-filled tank of adequate capacity relative to the coolant volume circulating in the loop via the reactor and steam generator, the above type of pressure drop in the loop resulting in automatic opening of the valve means, with the steam pressure always existing in the pressurizer driving the contents of the tank into the loop for circulation through the reactor, results in the core reactivity being adequately controlled to reduce the possibility of destruction to the normal reactor shut-down devices, such as the automatically actuated control rods. The quantity of concentrated boric acid thus introduced to the coolant should be at least sufficient so that the negative temperature coefficient of the reactor core prevents the latter from becoming critical again when it cools down.

To prevent excessive loss of steam pressure in the pressurizer by driving the coolant it contains back into the loop via the pressurizer connection with the latter, this connection, according to the invention, is provided with a reverse flow choke of the type which provides a greater choke or flow retarding action in a direction from the pressurizer to the loop, than it does in the opposite direction. Various types of such chokes are known. This arrangement means that a large majority of the pressurizer steam remains available to drive the concentrated boric acid solution from its tank into the loop when the pressure in the latter drops to an abnormal value.

A check valve means is preferably interposed in the pipe interconnecting the pressurizer and the concentrated boric acid solution tank, this valve closing when necessary to prevent flow of the concentrated solution from its tank reversely to the pressurizer, while opening when required to apply the pressurizer's steam pressure to the tank. To assure that the pressurizer steam pressure and the interior of the concentrated boric acid solution tank operate at substantially equal pressures under normal conditions, such a check valve means may be bypassed by a pipe line of very small flow capacity relative to that of the pipe line in which the check valve means is interposed. During possible small changes in the temperature of the concentrated boric acid solution, such a bypass prevents the development of unanticipated pressures within the solution's tank.

A pressurized-water reactor is normally provided with a plurality of steam generators each in circuit with its own coolant pipe line loop, and each of such loops may be provided with the protection afforded by the present invention.

Also, a pressurized-water reactor steam generator may be of the type using an inverted U-shaped tube bundle through which the coolant is circulated, the loop sending the coolant from the reactor to the inlet or hot leg of such a heat exchanger, and being returned via its outlet or cold leg to the reactor under the force of the main coolant circulating pump. With the present invention the concentrated boric acid solution tank may be connected so that in the event of the coolant pressure loss, the solution is discharged into either the section of the coolant loop going to the hot leg or the section leaving the cold leg and going to the reactor via the main coolant pump.

In the foregoing way the present invention solves the previously mentioned problem.

BRIEF DESCRIPTION OF THE DRAWINGS

An example of an embodiment of the invention is illustrated by the accompanying drawings in which:

FIG. 2 in vertical section shows an example of one type of reverse flow choke that can be used between the pressurizer and the coolant loop, as previously referred to.

DETAILED DESCRIPTION OF THE INVENTION

Figure 1:
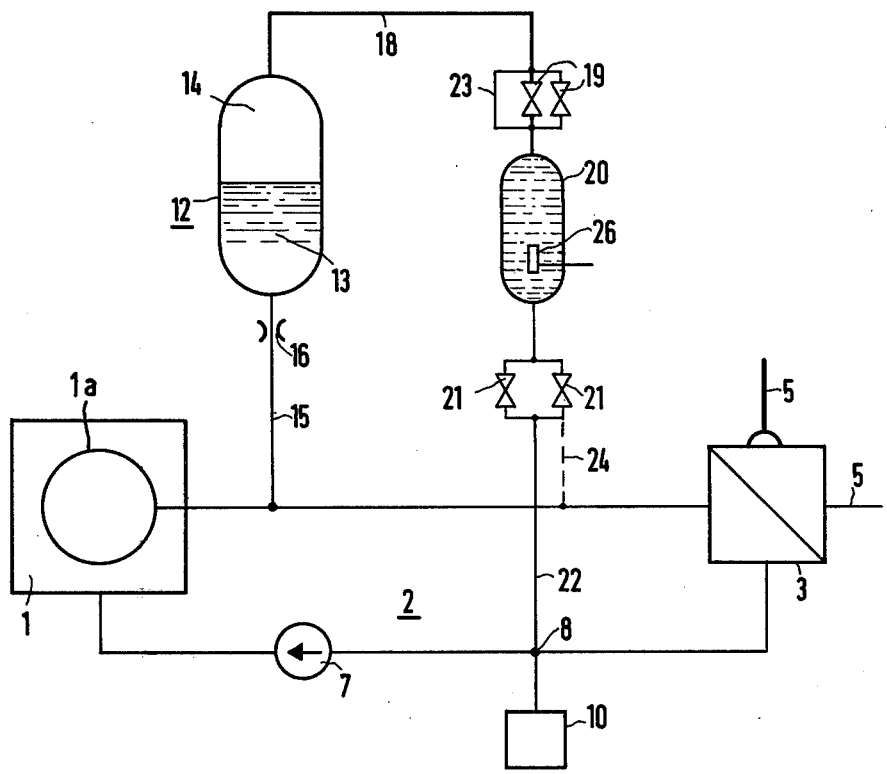
FIG. 1 is a flow diagram.

Having reference to the above drawings, FIG. 1 represents a pressurized-water power reactor installation of, for example, 1000 MWe. The reactor pressure vessel 1, which contains the reactor core 1a, is connected in circuit with the primary coolant pipe line loop generally designated at 2 and which connects in its circuit the steam generator 3, the coolant functioning there as the primary medium so that steam for power can be generated, the steam generator's secondary medium lines being indicated at 5. The coolant circulation is maintained by the main coolant pump 7 interposed in the loop.

The coolant, being water, is heated very substantially above the normal boiling temperature of water, the coolant being maintained under adequate pressure to keep it in its liquid phase, by the pressurizer generally indicated by the numeral 12. The lower portion of the pressurizer chamber contains a body of the coolant 13 and defines thereabove the steam space 14 containing steam by which the coolant is pressurized. To do this, the lower portion of the pressurizer chamber containing the body of coolant 13 connects with the loop 2 via a pipe line 15 in which the previously described reverse flow choke 16 is interposed. This choke should not interfere with the necessary functioning of the pressurizer but it should be designed to permit an easier flow from the loop to the pressurizer than it does to a reverse flow back to the loop.

A pipe line 18 connects the pressurizer's steam space 14 via the check valve means 19 with the concentrated boric acid solution tank 20 via the latter's upper portion. The check valves 19 should prevent backward flow of the concentrated solution from the tank 20 to the pressurizer 12 but there should be a reliable free flow of the steam from the space 14 to the tank 20 when required. It is for this reason that two of the check valves 19 are shown arranged in parallel, making it certain that at least one will open reliably when required.

Via the loop-pressure responsive valves 21 the lower portion of the tank 20 is connected by a pipe line 22 with the loop 2. This pipe line 22 connects with the section of the loop 2 carrying the coolant from the steam generator's cold leg and via the pump 7 forcing it into the pressure vessel 1 and into contact with the core 1a. In this instance also, two of the valves 21 are shown arranged in parallel in the interest of absolute reliability of operation. The valves 21 may be of any prior art type, although specially designed valves may be used. They should be normally closed at all times when the pressure differential between the inside of the tank 20 and the loop 2 is at a value representing a normal coolant operating pressure in the loop 2. If this pressure differential increases to a degree indicating an abnormal loss of coolant pressure in the loop, then the valve should automatically open. Because of their reliability, valves of the burst type are preferred. Prior art valves of this type comprise a casing closed by a diaphragm which bursts or ruptures under a predeterminable pressure differential.

Figure 2:
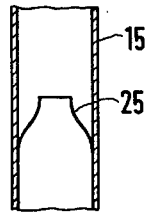

The reverse flow choke 16 may be constructed as indicated by FIG. 2 wherein the pipe line 15 has a insert 25 shaped like a nozzle and pointing in the direction of the pressurizer, the nozzle being smoothly contoured curvingly while reducing in cross section towards its orifice, thus permitting freer flow in the nozzle's pointing direction, than it does in the reverse direction. Thus, when the invention is required to go into operation, reverse flow from the pressurizer 12 back to the loop 2 is retarded to a sufficient degree to hold the steam pressure in the space 14 at a pressure higher than the abnormally reduced coolant pressure in the loop, to assure emptying of the tank 20 so that the concentrated boric acid solution is driven into the pipe line loop for delivery under the force of this pressure plus that of the pump 7 into the pressure vessel 1 to control the reactivity of the core 1a which would otherwise greatly increase when the coolant pressure drops abnormally. The broken line 24 is included by FIG. 1 to show that the discharge from the tank 20 may be to the section of the loop going to the hot leg of the steam generator 3.

The pipe 22 is shown as connecting with the loop 2 at the point 8 where the boric acid solution trimming tank 10 feeds as previously described. This boric acid solution used for chemical trimming has a boric concentration not exceeding 1200 ppm, is fed in small amounts to the coolant and cannot possibly effectively offset the reactivity of the core 1a. Constrastingly, the boric acid solution in the tank 20 has a concentration of more than 10,000 ppm and does provide an effective control of the core reactivity in case the coolant pressure accidentally drops excessively, it being for this reason that the tank 20 is provided with the heater 26 indicated in FIG. 1. This heater may be of any type, electric, steam or otherwise, providing it keeps the temperature of the concentrated solution high enough to prevent its high content of boric acid from precipitating or crystallizing at any time during which the reactor installation is in operation.

As previously indicated, a bypass line 23 is shunted around the valves 19. This line should be of small flow capacity relative to that of the pipe line 18 which must be adequate to permit the steam in the space 14 to rapidly drive the contents of the tank 20 into the loop. This shunting pipe 23 need only be large enough to equalize the pressures in the pressurizer 12 and the tank 20.

What is claimed is:

1. A pressurized-water reactor installation comprising a reactor pressure vessel, a nuclear core inside of said vessel, a primary coolant pipe line loop connected to said vessel and including a steam generator and a main coolant pump, said vessel and said loop containing water coolant, a pressurizer outside of said vessel and comprising a chamber having a lower portion containing water and an upper portion containing steam, a pipe line connecting the pressurizer's lower portion with said loop and pressurizing the water in the loop, a tank on the outside of said vessel and containing a concentrated solution of core-reactivity control substance, means for connecting the upper portion of said pressurizer with said tank and pressurizing said solution, and means for connecting said tank with said loop in response to pressure in the loop abnormally reducing relative to pressure in the tank.

2. The installation of claim 1 in which said pipe line connecting the pressurizer with the loop includes a reverse coolant flow choke retarding rapid pressure loss from said steam space directly to said coolant loop when said coolant pressure reduces and the last-named means effects said connecting.

3. The installation of claim 2 in which said tank has means for heating said solution when contained therein.

4. The installation of claim 2 in which said means connecting the pressurizer with the tank includes a check valve preventing backflow of the contents of said tank to said steam space while permitting flow from said steam space to said tank.

5. The installation of claim 4 in which a pressure-equalizing pipe line is shunted around said check valve and which is of small flow capacity relative to that from said steam space towards said tank effected by said check-valve action.

* * * * *